US011477186B2

(12) United States Patent
Milton et al.

(10) Patent No.: US 11,477,186 B2
(45) Date of Patent: Oct. 18, 2022

(54) MULTI-FACTOR USER AUTHENTICATION FOR NETWORK ACCESS

(71) Applicant: HEWLETT PACKARD ENTERPRISE DEVELOPMENT LP, Houston, TX (US)

(72) Inventors: Antoni Milton, Santa Clara, CA (US); Rajesh Kumar Ganapathy Achari, Mumbai (IN); Bhagya Prasad Nittur, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 179 days.

(21) Appl. No.: 16/426,420

(22) Filed: May 30, 2019

(65) Prior Publication Data

US 2020/0382485 A1 Dec. 3, 2020

(51) Int. Cl.
*H04L 9/40* (2022.01)
*G06F 16/245* (2019.01)

(52) U.S. Cl.
CPC .......... *H04L 63/083* (2013.01); *G06F 16/245* (2019.01); *H04L 63/108* (2013.01)

(58) Field of Classification Search
CPC ... H04L 63/083; H04L 63/108; G06F 16/245; G06F 21/31; G06F 21/43; H04W 12/06
See application file for complete search history.

(56) References Cited

U.S. PATENT DOCUMENTS

| 8,910,261 B2* | 12/2014 | Sheth ...................... G06F 21/40 |
| | | 726/7 |
| 9,118,656 B2* | 8/2015 | Ting ...................... H04L 63/105 |
| 9,569,634 B1* | 2/2017 | Yanacek ............. H04L 63/0815 |
| 2015/0280911 A1* | 10/2015 | Andoni ................. H04L 9/3234 |
| | | 713/168 |
| 2016/0080381 A1* | 3/2016 | Hall .................... H04L 63/0884 |
| | | 726/7 |
| 2017/0180374 A1* | 6/2017 | Gandhewar ............. H04L 63/10 |
| 2018/0332042 A1* | 11/2018 | Yu ....................... H04L 63/0884 |

OTHER PUBLICATIONS

Apereo CAS—Multifactor Authentication with Radius, (Web Page), Oct. 18, 2018, 5 Pgs.
Integrate RADIUS Authentication with Azure Multi-factor Authentication Server, (Web Page), Retrieved Jan. 23, 2019, 4 Pgs.
Multi-factor Authentication using Radius, (Technical Paper), Retrieved Jan. 23, 2019, 12 Pgs.
RADIUS for Active Directory Authentication, (Web Page), Retrieved Jan. 23, 2019, 4 Pgs.

* cited by examiner

*Primary Examiner* — Khoi V Le
(74) *Attorney, Agent, or Firm* — Nolte Lackenbach Siegel

(57) ABSTRACT

An authentication server associated with a network authenticates a primary user credential responsive to a request from a client device to access the network. The authentication server queries a database server for contact information for obtaining a secondary user credential. The contact information is provided to a third-party authentication server to obtain and authenticate the secondary user credential. In response to both the third-party authentication server obtaining and authenticating the secondary user credential successfully and the authentication server authenticating the primary user credential successfully, the client device is granted access to the network.

13 Claims, 5 Drawing Sheets

MULTI-FACTOR USER AUTHENTICATION FOR NETWORK ACCESS

BACKGROUND

Network service providers, such as enterprise network service providers and other network service providers, control the ability of client devices to communicate on a computer network. In the interest of network security, a network service provider typically authenticates a client device and a user attempting to access the network via the client device before allowing the client device to communicate over a network. Network access control and client device/user authentication are typically performed by a network access control server communicatively coupled to an authentication server.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
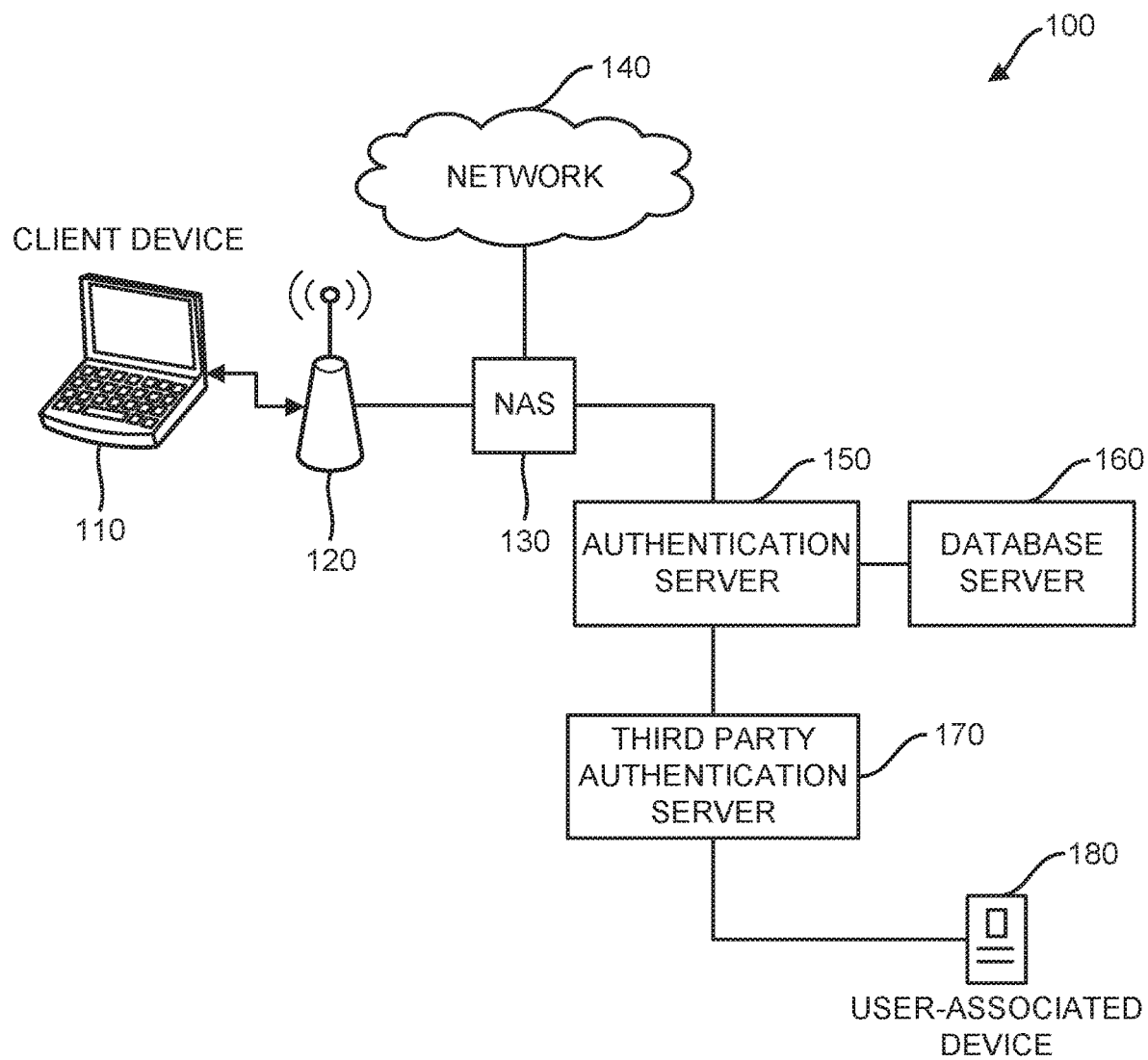
FIG. 1 conceptually illustrates a system using multi-factor authentication for controlling network access, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

A communication network (such as a wireless local area network (WLAN), a virtual local area network (VLAN), etc.) allows a client device to communicate with other communication devices, servers, etc. A client device refers to any form of programmable communication device including, but not limited to, personal computers, mobile devices (such as laptops, tablets, smartphones, personal data assistants (PDAs), etc.), etc. A server refers to a computing device including a processor that performs operations to provide an application or a service.

To allow a client device to communicate over the network, an authentication server identifies and authenticates the client device and the user attempting to access the network via the client device. This involves determining whether the user attempting to access the network via the client device is an authorized user. An authentication server refers to a server that may request or require authentication of a client device and/or a user of a client device.

To enhance network security, techniques have been proposed for multi-factor authentication to authenticate a user attempting to access a network via a client device. Typically, multi-factor authentication is performed by an authentication server and is browser-based. That is, a user attempting to access a network via a client device is required to enter a primary user credential, such as a username and password. The user is then required to launch a browser in the client device to enter a secondary user credential, such as a code. The primary and secondary user credentials are verified by the authentication server.

While such multi-factor techniques enhance security, they involve the user taking extra steps for authentication, such as launching a separate browser in the client device and then entering a secondary user credential. This is inconvenient and time-consuming for the user.

According to illustrative examples, multi-factor authentication of a client device is performed by an authentication server, in conjunction with a third-party server, in a manner that is convenient for a user. According to illustrative examples, upon authentication of a primary user credential, the authentication server communicates with the third-party authentication server to obtain and authenticate a secondary user credential. Secondary user credential authentication is performed seamlessly from the user's perspective by the third-party authentication server, without the user launching a browser on the client device to enter a secondary user credential.

FIG. 1 conceptually illustrates a system 100 using multi-factor authentication for controlling network access, according to one or more examples of the disclosure. Referring to FIG. 1, the system 100 includes a network access server (NAS) 130 that is communicatively coupled to an authentication server 150. The NAS 130 is also communicatively coupled to a client device 110 via an access point, such as the wireless access point 120. The wireless access point 120 relays messages to and from the client device 110 and the NAS 130. The NAS 130 provides the client device 110 with access to a network 140, under the control of the authentication server 150.

To access the network 140, the client device 110 sends a request including a primary user credential to the authentication server 150 via the wireless access point 120 and the NAS 130. The primary user credential, which may be associated with a user attempting to access the network 140 via the client device 110, may include, for example, a username and a password. Responsive to the request to access the network 140 received from the client device 110 via the NAS 130, the authentication server 150 authenticates the primary user credential. For example, the authentication server 150 determines whether the primary user credential provided by the client device 110 matches an authorized user credential that is stored in a memory in the authentication server 150.

If the primary user credential is not authenticated, i.e., if the primary user credential does not match a stored authorized user credential, the authentication server 150 may request that the client device 110 provide the primary user credential again. After a limited number of failed attempts by the client device 110 to provide the primary user credential, the authentication server 150 may deny the client device 110 access to the network 140.

Subsequent to successfully authenticating the primary user credential, the authentication server 150 initiates multi-factor authentication. The authentication server 150 may grant the client device 110 limited access to the network 140 while multi-factor authentication is being performed. For example, the authentication server 150 may grant the client device 110 access to the network 140 for 10 seconds or a time period long enough to complete multi-factor authentication. In one example, the authentication server 150 may grant the client device 110 limited access to the network 140 subsequent to successful authentication of the primary user credential but prior to successful authentication of a secondary user credential.

For multi-factor authentication, the system 100 also includes a database server 160 and a third-party authentication server 170, both of which are communicatively coupled to the authentication server 150. The authentication server 150 queries the database server 160 for contact information for obtaining a secondary user credential. The query includes the primary user credential. The database server 160 stores primary user credentials for various users in association with contact information for the users. The contact information may include, for example, a telephone number, an email address, a hyperlink, or other contact information for contacting a device associated with a user, such as a user-associated device 180. The database server 160 matches the primary user credential associated with the user attempting to access the network 140 via the client device 110 with the contact information associated with the user and provides the contact information to the authentication server 150.

The authentication server 150 provides the contact information to the third-party authentication server 170 to obtain and authenticate a secondary user credential. The third-party authentication server 170, in turn, uses the contact information to query the user-associated device 180 to obtain the secondary user credential. The user-associated device 180 may be, for example, a mobile phone, personal computer, laptop, or tablet associated with the user, a database server having user-associated information, etc. Although shown as a separate device, the user-associated device 180 may be the same as the client device 110.

The secondary user credential may include a confirmation response provided by the user-associated device 180 responsive to a query from the third-party authentication server 170. The confirmation response either confirms or denies that the user attempting to access the network 140 via the client device 110 is an authorized user.

For example, the third-party authentication server 170 may use a telephone number provided by the database server 160 to send an SMS message to the user-associated device 180. The SMS message may include a hyperlink which may be clicked on to confirm that the user attempting to access the network is an authorized user. As an alternative or an addition, the SMS message may prompt a user for a confirmation response including a "yes" reply to indicate that the user attempting to access the network 140 is an authorized user or a "No" reply to indicate that the user attempting to access the network is not an authorized user.

In another example, the user-associated device 180 may have a software application installed thereon that responds to a push notification from the third-party authentication server 170 to prompt a user to enter "yes" or "no" as a confirmation response.

As another example, the third-party authentication server 170 may use an email address provided by the database server 160 to send an email to the user-associated device 180. The email may include a hyperlink which may be clicked on to confirm that the user attempting to access the network 140 is an authorized user.

As yet another example, the third-party authentication server 170 may use a hyperlink provided by the database server 160 to contact the user-associated device 180 to obtain the secondary user credential. In this case, the user-associated device 180 may be a database server having user-associated information. For example, the user-associated device 180 may be a user-associated database server that keeps track of badge swipes by a user. If the user has swiped a badge within a given time period, e.g., a day, of the attempt by the client device 110 to access the network 140, the badge swipe serves as a confirmation that the user attempting to access the network 140 is an authorized user. If the user has not swiped a badge within the given time period, this serves as an indication that the user attempting to access the network 140 is not an authorized user.

The user-associated device 180 provides the secondary user credential to the third-party authentication server 170 for authentication. If the secondary user credential includes a confirmation response that confirms that the user attempting to access the network 140 is an authorized user, the third-party authentication server 170 authenticates the secondary user credential. Otherwise, the third-party authentication server 170, the secondary user credential is not authenticated.

The third-party authentication server 170 communicates with the authentication server 150 to indicate whether or not the secondary user credential is authenticated, Responsive to both third-party authentication server 170 obtaining and authenticating the secondary user credential successfully and the authentication server authenticating the primary user credential successfully, the authentication server 150 communicates with the client device 110 via the NAS 130 and the access point 120 to grant the client device 110 access to the network 140.

Once access is granted to the client device 110, the client device 110 can communicate with other devices and servers connected to the network 140 (not shown). Also, the authentication server 150 may store a multi-factor authentication success status in a cache for a predetermined time period, e.g., a day, such that multi-factor authentication does not need not be repeated for the predetermined time period. This avoids a potential lapse in access to the network 140 by the client device 110, e.g., if a user of the client device 110 takes a break for a small amount of time, e.g., an hour, and then wants to continue accessing the network 140. In such a case, the client device 110 would be granted access to the network 140 based on successful authentication of the primary user credential and the cached multi-factor authentication success status.

According to illustrative examples, the Remote Authentication Dial In User Service (RADIUS) protocol according to the IEEE 802.1X standard may be utilized for communications between the authentication server 150, the NAS 130, the client device 110, the database server 160, the third-party authentication server 170, and the user-associated device 180. Information exchanged according to the RADIUS protocol includes authentication information (to authenticate users or client devices before allowing them access to a network), authorization information (to authorize those users or client devices for specific network services), and accounting information (to account for and track the usage of those services by the users). Information is exchanged by way of RADIUS messages.

Figure 2:
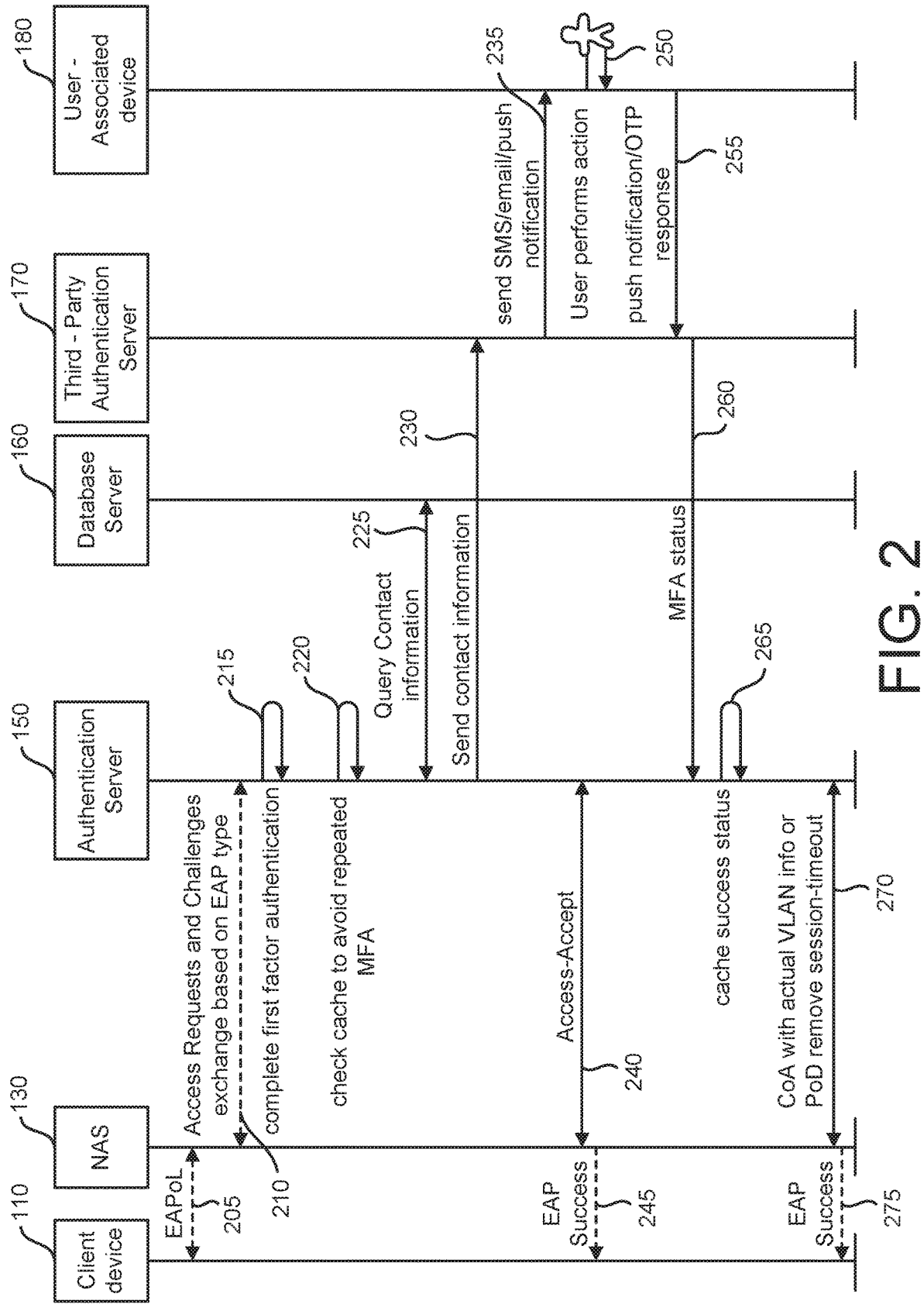
FIG. 2 illustrates an example of message and action flow for multi-factor authentication, according to one or more examples of the disclosure.

This may be understood with reference to FIG. 2 which illustrates an example of message and action flow for multi-factor authentication, according to one or more examples of the disclosure. As the access point 120 simply relays messages between the client device 110 and the NAS 130, the access point 120 is not represented in FIG. 2 for simplicity of illustration.

Referring to FIG. 2, the client device 110 sends a sign-on message 205 to the NAS 130. The sign-on message 205 may include an Extensible Authentication Protocol (EAP) over LAN (EAPoL) request to access the network 140. The sign-on message includes a primary user credential associated with a user attempting to access the network 140 via the client device 110.

Responsive to the sign-on message 205, the NAS 130 initiates an access request and challenge message exchange 210 with the authentication server 150, based on the EAP type. The message exchange 210 may include an access request message including the primary user credential provided by the client device 110.

The authentication server 150 authenticates the primary user credential at 215, completing first factor authentication. The authentication server 150 may also check a cache at 220 to determine whether multi-factor authentication (MFA) has been performed within a predetermined time period to avoid unnecessarily repeating multi-factor authentication.

If multi-factor authentication has not been performed for the predetermined time period, the authentication server 150 initiates a message exchange 225 with the database server 160 to query and obtain contact information for the user-associated device 180. The query may include at least part of the primary user credential associated with the user, such as the username, and the database server 160 may match the primary user credential with the associated contact information for the user and return the requested contact information as part of the exchange 225.

The authentication server 150 provides the contact information to the third-party authentication server 150 via a message 230. As an example, in the case of the contact information being a mobile telephone number, the message 230 may include an application programming interface (API) call with a mobile telephone number as the argument.

The third-party authentication server 170 uses the contact information provided by the authentication server 150 to query the user-associated device 180 for a confirmation response in a message 235. The message 235 may include an email message, an SMS message, a push notification, etc.

While multi-factor authentication is being carried out, the authentication server 150 may grant the client device 110 limited access to the network 140 by sending an access-accept message 240 to the NAS 130. The message 240 may specify a minimum or low quality of service (QoS) to be provisioned for the client device 110 for accessing the network 140, as well as a time period after which access of the client device 110 to the network 140 will time out. The NAS 130, in turn, sends an EAP success message 245 to the client device 110, provisioning the client device 110 with limited access to the network 140.

Returning to the description of multi-factor authentication, if a user action is required to provide a confirmation response to confirm or deny that the user requesting access to the network via the client device 110 is an authorized user, such as clicking on a hyperlink or responding to a "Yes"/"No" prompt, such action is taken using the user-associated device 180 at 250. The user-associated device 180 sends a message 255 including the confirmation response to the third-party authentication server 170. The message 255 may include a push notification response or a "one-time password" (OTP) response.

The third-party authentication server 170 authenticates the secondary credential by determining whether the confirmation response confirms or denies that the user requesting access to the network via the client device is an authorized user and sends a message 260 with the multi-factor authentication (MFA) status to the authentication server 150. If the MFA status indicates that multi-factor authentication is successful, the authentication server 150 caches an MFA success status for a predetermined time period at 265.

The authentication server 150 sends a message 270 to the NAS 130 to either grant access or deny access of the client device 110 to the network 140. If the multi-factor authentication is successful, the message 270 may contain a change of authorization (COA) with information for connecting to the network 140, e.g., the VLAN. If the multi-factor authentication is not successful, the message 270 may contain a packet of disconnect (POD) instruction to remove access of the client device 110 to the network 140.

If the message 270 contains a CoA with information for connecting to the network 140, the NAS 130 sends an EAP success message 275 to the client device 110, provisioning the client device 110 with access to the network 140. Otherwise, the NAS 130 does not send a message to the client device 110, and the limited access of the client device 110 to the network will eventually timeout.

Figure 3:
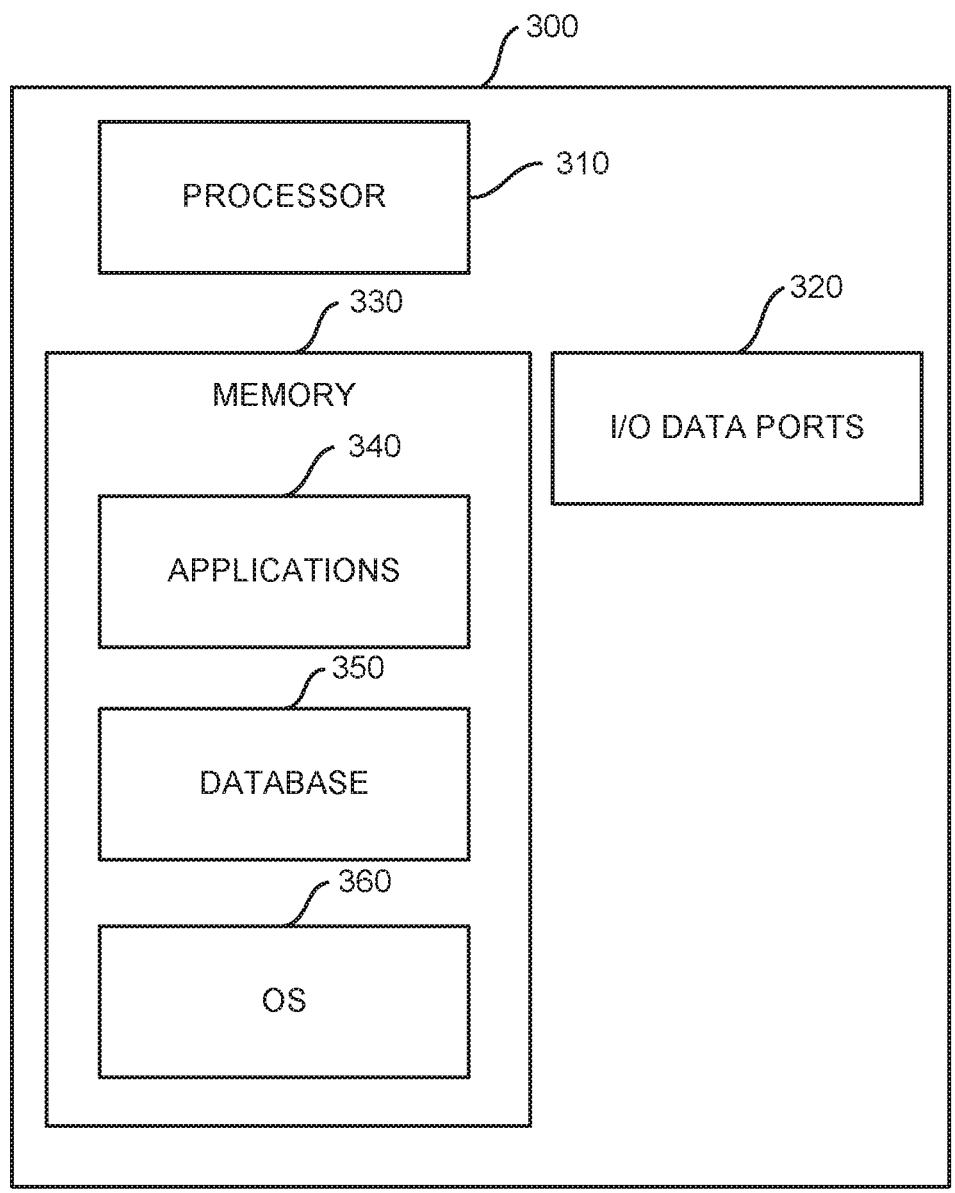
FIG. 3 is a flowchart depicting a method for controlling network access using multi-factor authentication, according to one or more examples of the disclosure.

FIG. 3 is a block diagram of a computing device 300 with which the authentication server 150 shown in FIG. 1 may be implemented, according to illustrative examples. The NAS 130, the database server 160, and the third-party authentication server 170 shown in FIG. 1 may also be implemented with a computing device, such as the computing device 300 shown in FIG. 3. Also, in the case of the user-associated device 180 shown in FIG. 1 being a user-associated database server, the user-associated device 180 may be implemented with a computing device, such as the computing device shown in FIG. 3. Although no connections are shown between the components illustrated in FIG. 3, those skilled in the art will appreciate that the components can interact with each other via any suitable connections to carry out device functions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, microprocessor-based, programmable consumer electronics, combinations thereof, and the like. The terminology "computer-readable medium" and variants thereof, as used in the specification and claims, includes non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed.

Referring to FIG. 3 with continued reference to FIGS. 1 and 2, the computing device 300 includes a processor 310 that receives inputs and transmits outputs via an interface 320. The interface 320 can be implemented with, e.g., any suitable interface through which data and signals may be received and transmitted wired and/or wirelessly. For example, for the authentication server 150, the inputs and outputs may include messages to and from the NAS 130, the database server 160, and the third-party authentication server 170.

Although not shown, the computing device 300 may also include a physical hard drive. The processor 310 communicates with memory 330 and the hard drive via, e.g., an address/data bus (not shown). The processor 310 can be any commercially available or custom microprocessor. The memory 330 is representative of the overall hierarchy of memory devices containing the software and data used to implement the functionality of the computing device 300. The memory 330 can include, but is not limited to, the types of memory devices described above, including a non-transitory computer readable medium. As shown in FIG. 3, the memory 330 may include several categories of software and data used in the computing device 300, including applications 340, a database 350, an operating system (OS) 360, etc.

The applications 340 can be stored in the memory 330 and/or in a firmware (not shown) and can include computer readable instructions that can be executed by the processor 310 to implement the various features of the device 300. For example, the applications 340 may include computer readable instructions to implement the functions of the authentication server 150. This is described in further detail below with reference to FIG. 4.

The database 350 represents the static and dynamic data used by the applications 340, the OS 360, and other software programs that may reside in the memory. The database 350 may be used to store various data including data needed to execute the applications 340, e.g.; authorized user credentials to which primary user credentials may be matched, contact information provided by the database server 160, multi-factor authentication success status provided by the third-party authentication server 170, etc.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like.

It should be understood that FIG. 3 and the description above are intended to provide a brief, general description of a suitable environment in which the various aspects of some examples of the present disclosure can be implemented. While the description includes a general context of computer-executable instructions, the present disclosure can also be implemented in combination with other program modules and/or as a combination of hardware and software in addition to, or instead of, computer readable instructions.

Figure 4:
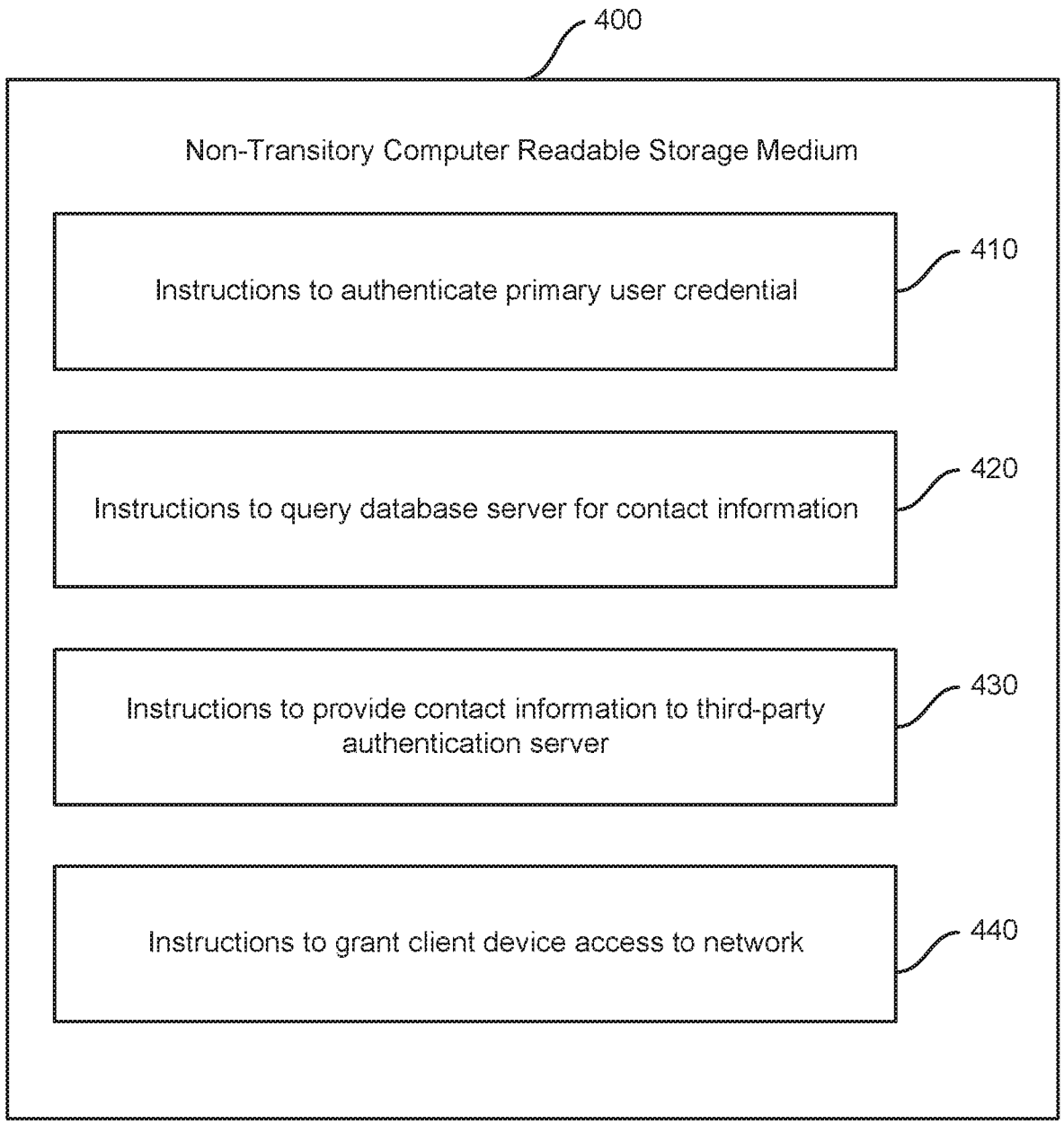
FIG. 4 conceptually illustrates details of a computing device, according to one or more examples of the disclosure.

FIG. 4 conceptually illustrates a non-transitory computer readable medium according to one or more examples of the disclosure. According to an illustrative example, the non-transitory computer readable medium 400 may be included as the memory 330 shown in FIG. 3. The non-transitory computer readable medium has computer readable instructions stored thereon that may be executable by the processor 310 shown in FIG. 3. As shown in FIG. 4, the instructions may include instructions 410 to authenticate a primary user credential, instructions 420 to query a database server for contact information, instructions 430 to provide contact information to a third-party authentication server, and instructions 440 to grant a client device access to a network.

Figure 5:
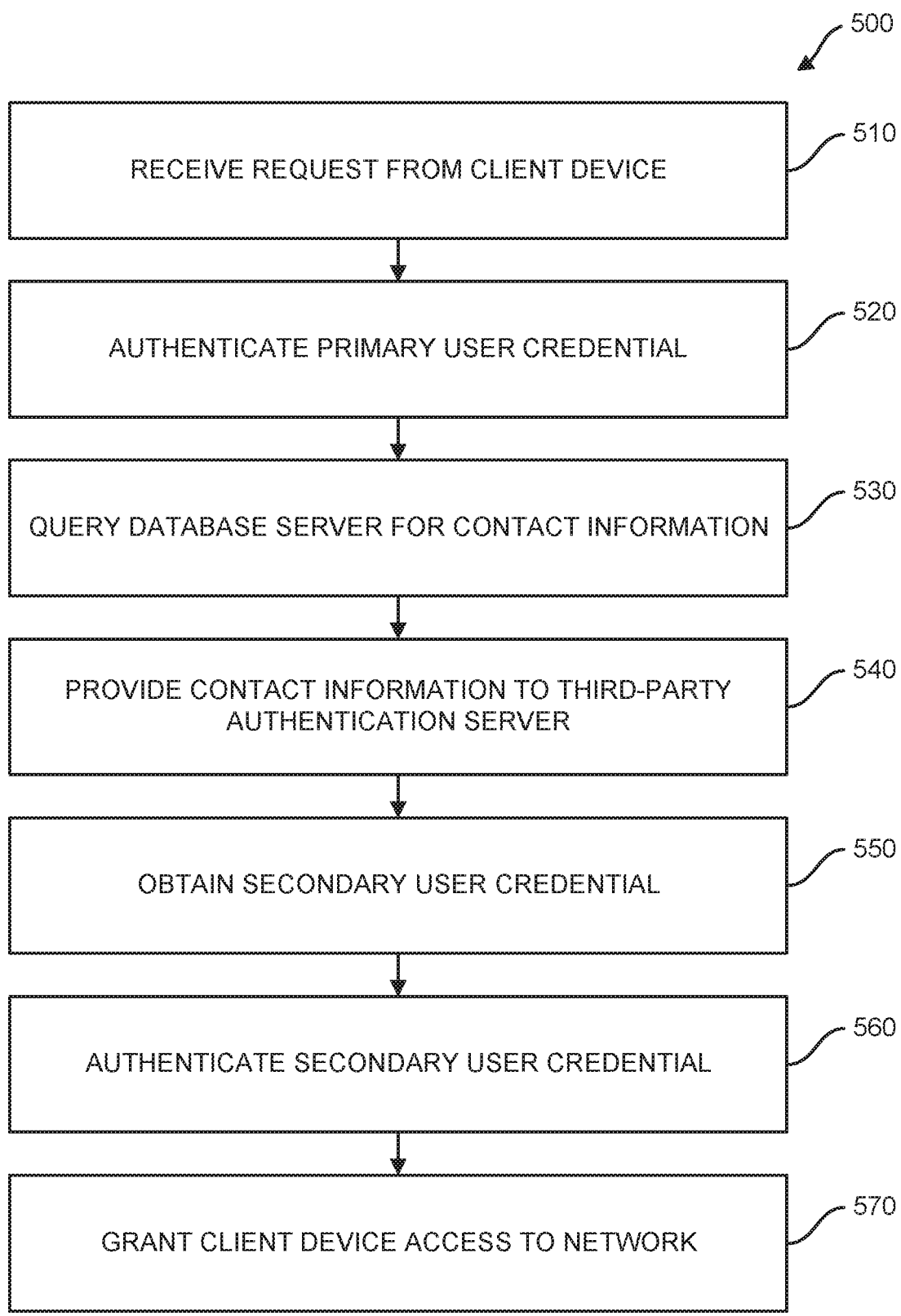
FIG. 5 illustrates conceptually illustrates a non-transitory computer readable medium, according to one or more examples of the disclosure.

FIG. 5 is a flow chart depicting a method 500 for controlling access of a client device to a network using multi-factor authentication, according to illustrative examples. Referring to FIG. 5, the method 500 includes receiving a request from a client device at an authentication server at 510. The request is to access a network. At 520, the authentication server authenticates a primary user credential associated with a user. At 530, the authentication server queries a database server for contact information for obtaining a secondary user credential. The contact information is provided to a third-party authentication server at 540.

At 550, the third-party authentication server obtains the secondary user credential. At 560, the third-party authentication server authenticates the secondary user credential. At 570, in response to both the third-party authentication server obtaining and authenticating the secondary user credential successfully and the authentication server authenticating the primary user credential successfully, the authentication server grants the client device access to the network.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method comprising:
responsive to a request from a client device to access a network, authenticating, by a first authentication server comprising a hardware processor and associated with the network, a primary user credential;
sending, by the first authentication server, a query to a database server for contact information for obtaining a secondary user credential, wherein the query includes the primary user credential;
receiving, by the first authentication server from the database server in response to the query, the contact information matched by the database server to the primary user credential, wherein the database server stores different contact information in association with respective primary user credentials for users;
providing, by the first authentication server, the contact information received from the database server to a third-party authentication server to obtain and authenticate the secondary user credential, wherein the third-party authentication server obtains the secondary user credential by using the provided contact information from the first authentication server to query a user-associated device for the secondary user credential;
in response to both the third-party authentication server obtaining and authenticating the secondary user credential successfully and the first authentication server authenticating the primary user credential successfully, granting the client device access to the network;
caching a multi-factor authentication success status for a predetermined time period in response to the third-party authentication server obtaining and authenticating the secondary user credential successfully; and responsive to a subsequent request from the client device for accessing the network during the predetermined time period, granting the client device access to the network based on both successfully authenticating the primary user credential and the multi-factor authentication success status being cached.

2. The method of claim 1, further comprising granting the client device limited access to the network subsequent to successfully authenticating the primary user credential and prior to the third-party authentication server successfully authenticating the secondary user credential.

3. The method of claim 1, wherein the contact information includes at least one of a telephone number, an email address, or a hyperlink.

4. The method of claim 1, wherein the primary user credential includes at least one of a user name or a password.

5. The method of claim 1, wherein the secondary user credential includes a confirmation response provided by the user-associated device.

6. A first authentication server comprising:
a processor; and
a non-transitory storage medium storing instructions executable on the processor to:
authenticate a primary user credential associated with a user responsive to a request from a client device to access a network;
send, from the first authentication server to a database server, a query for contact information for obtaining a secondary user credential associated with the user, wherein the query includes the primary user credential;
receive, at the first authentication server from the database server in response to the query, the contact information matched by the database server to the primary user credential, wherein the database server stores different contact information in association with respective primary user credentials for users;
provide, from the first authentication server to a third-party authentication server, the contact information received from the database server to obtain and authenticate the secondary user credential, wherein the third-party authentication server obtains the secondary user credential by using the provided contact information from the first authentication server to query a user-associated device for the secondary user credential;
in response to both the first authentication server authenticating the primary user credential successfully and the third-party authentication server obtaining and authenticating the secondary user credential successfully, grant the client device access to the network;
cache a multi-factor authentication success status for a predetermined time period responsive to the third-party authentication server obtaining and authenticating the secondary user credential successfully; and
responsive to a subsequent request from the client device for accessing the network during the predetermined time period, grant the client device access to the network based on both successfully authenticating the primary user credential and the multi-factor authentication success status being cached.

7. The first authentication server of claim 6, wherein the instructions are executable on the processor to grant the client device limited access to the network subsequent to successfully authenticating the primary user credential and prior to the third-party authentication server successfully authenticating the secondary user credential.

8. The first authentication server of claim 6, wherein the non-transitory storage medium is to store a database, and wherein the processor is to cache the multi-factor authentication success status in the database responsive to the third-party authentication server obtaining and authenticating the secondary user credential successfully.

9. The first authentication server of claim 6, wherein the contact information includes at least one of a telephone number, an email address, or a hyperlink.

10. The first authentication server of claim 6, wherein the secondary user credential includes a confirmation response provided by the user-associated device.

11. A non-transitory computer readable medium comprising instructions that when executed on a processor cause a first authentication server to:
authenticate a primary user credential associated with a user responsive to a request from a client device to access a network;
send, from the first authentication server to a database server, a query for contact information for obtaining a secondary user credential associated with the user, wherein the query includes the primary user credential;
receive, at the first authentication server from the database server in response to the query, the contact information matched by the database server to the primary user credential, wherein the database server stores different contact information in association with respective primary user credentials for users;
provide, from the first authentication server to a third-party authentication server, the contact information received from the database server to obtain and authenticate the secondary user credential, wherein the third-party authentication server obtains the secondary user credential by using the provided contact information from the first authentication server to query a user-associated device for the secondary user credential;
in response to both the first authentication server authenticating the primary user credential successfully and the third-party authentication server obtaining and authenticating the secondary user credential successfully, grant the client device access to the network;
cache a multi-factor authentication success status for a predetermined time period responsive to the third-party authentication server obtaining and authenticating the secondary user credential successfully; and
responsive to a subsequent request from the client device for accessing the network during the predetermined time period, grant the client device access to the network based on both successfully authenticating the primary user credential and the multi-factor authentication success status being cached.

12. The non-transitory computer readable medium of claim 11, wherein the instructions, when executed, cause the first authentication server to grant the client device limited access to the network subsequent to successfully authenticating the primary user credential and prior to the third-party authentication server successfully authenticating the secondary user credential.

13. The non-transitory computer readable medium of claim 11, wherein the contact information includes at least one of a telephone number or an email address.

* * * * *